United States Patent
Hunukumbure et al.

(10) Patent No.: US 11,197,264 B2
(45) Date of Patent: Dec. 7, 2021

(54) METHODS AND APPARATUS FOR TRANSMITTING AND RECEIVING A POSITIONING REFERENCE SIGNAL IN A WIRELESS COMMUNICATION SYSTEM

(71) Applicant: SAMSUNG ELECTRONICS CO., LTD., Suwon-si (KR)

(72) Inventors: Mythri Hunukumbure, Middlesex (GB); Yinan Qi, Middlesex (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/793,213

(22) Filed: Feb. 18, 2020

(65) Prior Publication Data
US 2020/0267686 A1  Aug. 20, 2020

(30) Foreign Application Priority Data
Feb. 15, 2019 (GB) ...................... 1902158

(51) Int. Cl.
*H04W 64/00* (2009.01)
*H04W 4/029* (2018.01)
(Continued)

(52) U.S. Cl.
CPC ............ *H04W 64/003* (2013.01); *H04L 1/08* (2013.01); *H04L 5/001* (2013.01); *H04L 5/0048* (2013.01);
(Continued)

(58) Field of Classification Search
CPC ............... H04W 64/003; H04W 4/029; H04W 72/0446; H04W 64/00; H04W 4/70; H04W 4/02; H04L 5/0048; H04L 5/001; H04L 1/08; H04L 5/0092; H04L 5/0094; H04L 5/0064; H04L 5/005
See application file for complete search history.

(56) References Cited

U.S. PATENT DOCUMENTS 10,716,084 B2 * 7/2020 Wang ...................... G01S 5/021
2015/0296359 A1 10/2015 Edge
(Continued)

FOREIGN PATENT DOCUMENTS

KR  10-2017-0134116  12/2017
WO  2016/122761    8/2016
(Continued)

OTHER PUBLICATIONS

3GPP TSG RAN WG1; 3ATT, "NR Positioning Reference Signals for OTDOA." R1-1812616, 3GPP TSG RAN WG1 Meeting #95, Spokane, JSA, Nov. 3, 2018 (Year: 2018).*
(Continued)

*Primary Examiner* — Brandon J Miller
(74) *Attorney, Agent, or Firm* — Nixon & Vanderhye P.C.

(57) ABSTRACT

A positioning reference signal (PRS) is transmitted by a first base station in a wireless communication system. A first PRS having a first PRS pattern is transmitted using a first sub-carrier spacing (SCS). A user equipment (UE) receives information associated with positioning of the UE including the first PRS from the first base station and a second PRS from the second base station. The first SCS is different from a second SCS applied to the second PRS having a second PRS pattern.

20 Claims, 6 Drawing Sheets

(a) LTE-sub-carrier spacing = 15 kHz (b) 5G-NR option-sub-carrier spacing = 30 kHz

(51) Int. Cl.
*H04L 5/00* (2006.01)
*H04L 1/08* (2006.01)
*H04W 72/04* (2009.01)

(52) U.S. Cl.
CPC ........... *H04L 5/0092* (2013.01); *H04W 4/029* (2018.02); *H04W 72/0446* (2013.01)

(56) References Cited

U.S. PATENT DOCUMENTS

| | | | |
|---|---|---|---|
| 2018/0097596 A1 | 4/2018 | Palanivelu et al. | |
| 2018/0302873 A1 | 10/2018 | Kazmi et al. | |
| 2019/0044677 A1 | 2/2019 | Ly | |
| 2019/0174454 A1* | 6/2019 | Priyanto | G01S 1/042 |
| 2020/0052845 A1* | 2/2020 | Chuang | H04L 5/0048 |
| 2020/0235877 A1* | 7/2020 | Manolakos | H04W 4/029 |
| 2020/0382263 A1 | 12/2020 | Xu et al. | |

FOREIGN PATENT DOCUMENTS

| | | |
|---|---|---|
| WO | 2017/184865 | 10/2017 |
| WO | 2018/019365 | 2/2018 |
| WO | 2018/144667 | 8/2018 |
| WO | 2019/192362 | 10/2019 |
| WO | 2019/232456 | 12/2019 |
| WO | 2020/062005 | 4/2020 |

OTHER PUBLICATIONS

Search Report dated May 13, 2020 in counterpart International Patent Application No. PCT/KR2020/001791.
Written Opinion dated May 13, 2020 in counterpart International Patent Application No. PCT/KR2020/001791.
Catt, "NR Positioning Reference Signals for OTDOA." R1-1812616, 3GPP TSG RAN WG1 Meeting #95, Spokane, USA, Nov. 3, 2018.
Ericsson, "Downlink Positioning Solutions: design and evaluations," R1-1901195, 3GPP TSG RAN WG1 Ad Hoc Meeting #1901, Taipei, Taiwan, Jan. 11, 2019.
Samsung, "System-level Performance Evaluation for RAT-Dependent Positioning Techniques," R1-1901093, 3GPP TSG RAN WG1 Ad Hoc Meeting #1901, Taipei, Taiwan, Jan. 11, 2019.
"Study on NR-Positioning Support", R1-1811987, published Oct. 8, 2018, 6 pages.
Campos, "Understanding the 5G NR Physical Layer", published Nov. 1, 2017, 111 pages.
Office Action for GB Application No. 1902158.3 dated Aug. 12, 2020, 7 pages.
Search Report for EP Application No. 20706376.9 dated Jan. 25, 2021, 8 pages.
Office Action for IN Application No. 202027011248 dated Jun. 17, 2021, 6 pages.

* cited by examiner (a) PRS pattern for cell with SCS = 15 kHz (b) PRS pattern for cell with SCS = 30 kHz (a) PRS pattern for cell with SCS = 15 kHz (b) PRS pattern for cell with SCS = 30 kHz (a) PRS pattern for cell with SCS = 15 kHz (b) PRS pattern for cell with SCS = 30 kHz

METHODS AND APPARATUS FOR TRANSMITTING AND RECEIVING A POSITIONING REFERENCE SIGNAL IN A WIRELESS COMMUNICATION SYSTEM

CROSS-REFERENCE TO RELATED APPLICATION

This application is based on and claims priority under 35 U.S.C. § 119 to Great Britain Patent Application No. 1902158.3, filed on Feb. 15, 2019, in the Great Britain Patent Office, the disclosure of which is incorporated by reference herein in its entirety.

BACKGROUND

Field

The present disclosure relates to methods, apparatus for transmitting and receiving positioning reference signal in a wireless communication system.

Description of Related Art

Wireless or mobile (cellular) communications networks in which a mobile terminal (user equipment, UE, such as a mobile handset) communicates via a radio link with a network of base stations, or other wireless access points or nodes, have undergone rapid development through a number of generations. The $3^{rd}$ Generation Partnership Project (3GPP) design, specify and standardise technologies for mobile wireless communication networks. Fourth Generation (4G) systems are now widely deployed.

3GPP standards for 4G systems include an Evolved Packet Core (EPC) and an Enhanced-UTRAN (E-UTRAN: an Enhanced Universal Terrestrial Radio Access Network). The E-UTRAN uses Long Term Evolution (LTE) radio technology. LTE is commonly used to refer to the whole system including both the EPC and the E-UTRAN, and LTE is used in this sense in the remainder of this document. LTE should also be taken to include LTE enhancements such as LTE Advanced and LTE Pro, which offer enhanced data rates compared to LTE.

The trend towards greater data throughput continues with 3GPP currently working to standardise Fifth Generation (5G) network technologies. As part of this, a new air interface is being developed, which may be referred to as 5G New Radio (5G NR) or simply NR. NR is designed to support the wide variety of services and use case scenarios envisaged for 5G networks, though builds upon established LTE technologies. One aspect of 5G NR is the provision of enhanced positioning techniques for determining the positions of both user equipment (UE) and 5G NR base stations (next generation Node Bs (gNBs)), where the position of UEs and gNBs is at least required for effective beamforming but also for the provision of location dependent services. Whilst Positioning Reference Signals (PRS) are utilised in LTE and LTE Advanced, the configuration of these PRS is required to be enhanced or new positioning signals defined if the advantages of position-dependent functionality in 5G NR are to be achieved. In particular, due to the adaptive/variable/scalable numerology of 5G NR networks, existing approaches to the transmission and/or reception of PRS may not be appropriate for all configurations of 5G NR networks.

SUMMARY

Embodiments of the disclosure provide a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The present disclosure addresses enabling the effective transmission and reception of positioning reference signals across the different possible network configurations in 5G New Radio (NR) systems, and in particular, the different configurations that may result from the scalable numerology of 5G NR networks.

According to a first example aspect of the present disclosure a method for transmitting positioning reference signals, PRS, in a 5G New Radio, NR, communications network is provided, the network comprising a first base station configured to operate a first cell with a first OFDM subcarrier spacing, SCS, and a second base station configured to operate a second cell with a second OFDM SCS, the second SCS being higher than the first SCS, and wherein time resources of each cell are divided into subframes of a same predetermined duration and the subframes of the first and second cells are divided in time into one or more time slots based on their respective SCS, the method comprising transmitting, by the first base station within a subframe of the first cell, a first PRS pattern with a first repetition frequency, and transmitting, by the second base station within a corresponding subframe of the first cell, a second PRS pattern with a second repetition frequency, wherein the first repetition frequency is based on the number of time slots in a subframe of the first cell and the second repetition frequency is based on the number of slots in the subframe of the second cell, and the second PRS pattern is based on the first PRS pattern.

In one example, the PRS patterns may be repeated in every slot of the subframe and the repeated pattern can be an exact repetition, a cyclically swapped repetition (with the cycle based on the number of slots per subframe) or a continuation of a block diagonal pattern.

In an example of the present disclosure the first PRS pattern is transmitted in each time slot of the first cell, and the second PRS pattern is transmitted in each time slot of the second cell such that the first repetition frequency is equal to the number of time slots in a subframe of the first cell, and the second repetition frequency is equal to the number of time slots in a subframe of the second cell.

In an example of the present disclosure the first PRS pattern and the second PRS pattern are diagonal patterns with respect to the time slots of the first and second cells.

In an example of the present disclosure the first PRS pattern is the same as the second PRS pattern.

In an example of the present disclosure each time slot of the first cell and the second cell is divided in time into a predetermined number of symbols, and wherein transmitting the first and second PRS patterns includes transmitting at least part of the first and second PRS patterns in the first symbol of the first slot of the subframe of their respective cells.

In an example of the present disclosure the transmission of the second PRS pattern in the second cell is shifted by at least one subcarrier with respect to the transmission of the first PRS pattern in the first cell.

In an example of the present disclosure the second PRS pattern is a block diagonal form of the first PRS pattern, and each block of the second PRS pattern is shifted by at least one subcarrier with respect to the corresponding portion of the first PRS pattern.

According to a second example aspect of the present disclosure a method for transmitting positioning reference signals, PRS, by a base station in a 5G New Radio, NR, communications network, is provided, the base station being configured to operate a first cell with an OFDM subcarrier spacing, SCS, and the time resources of the cell being divided into subframes and each subframes being divided in time into one or more time slots based on the SCS, the method comprising transmitting, by the base station within a subframe of the cell, a PRS pattern with a repetition frequency, wherein the repetition frequency is based on the number of time slots in the subframe In an example of the present disclosure the PRS pattern is transmitted in each time slot of the subframe such that the repetition frequency is equal to the number of time slots in the subframe.

In an example of the present disclosure the PRS pattern is a diagonal pattern with respect to a time slot.

In an example of the present disclosure each time slot of the cell is divided into a predetermined number of symbols, and wherein transmitting the PRS pattern includes transmitting at least part of the PRS pattern in the first symbol of the first slot of the subframe.

In an example of the present disclosure at least part of the PRS pattern is transmitted in every symbol of each time slot.

According to a third example aspect of the present disclosure a 5G New Radio, NR, communications network is provided, the network comprising a first base station configured to operate a first cell with a first OFDM subcarrier spacing, SCS, and a second base station configured to operate a second cell with a second OFDM SCS, the second SCS being higher than the first SCS and time resources of each cell being divided into subframes of a same predetermined duration, wherein the communication network is configured to perform the method of any of the first aspect and the related examples.

According to a fourth example aspect of the present disclosure a method for receiving position reference signals by a UE in a 5G New Radio, NR, communications network is provided, the network comprising a first base station operating a first cell with a first OFDM subcarrier spacing, SCS, and a second base station operating a second cell with a second OFDM SCS, the second SCS being higher than the first SCS, and wherein time resources of each cell are divided into subframes of a same predetermined duration, the method comprising receiving, from the first base station within a subframe of the first cell, a first PRS pattern, and receiving, from the second base station within a subframe of the second cell, a second PRS pattern, wherein the second PRS pattern is based on the first PRS pattern In an example of the present disclosure the receiving the first PRS and the second PRS includes sampling the first and second PRS signals at a sampling frequency corresponding to one of the first SCS or the second SCS.

In an example of the present disclosure the subframes of the first and second cells are divided in time into time slots based on their respective SCS, and wherein, when the sampling frequency corresponds to the first SCS, the receiving the second PRS comprises receiving a first portion of the second PRS in first time slot and a second portion of the second PRS in a second time slot. In an example of the present disclosure the subframes of the first and second cells are divided in time into time slots based on their respective SCS and each time slot of the cell is divided into a plurality of symbols, and wherein receiving the first PRS pattern includes receiving at least part of the first PRS pattern in the a first symbol of the first slot of the subframe of the first cell, and receiving the second PRS pattern includes receiving at least part of the second PRS pattern in the a first symbol of the first slot of the subframe of the second cell.

According to a fifth example aspect of the present disclosure a UE configured to perform the any of the method of the fourth example aspect and the related examples is provided. According to an aspect of the present disclosure there is provided a computer readable storage medium having stored thereon computer executable instructions which when executed by a computer cause the computer to perform the above method.

Another example aspect of the present disclosure provides a computer program comprising instructions arranged, when executed, to implement a method and/or apparatus in accordance with any one of the above-described aspects. A further aspect provides machine-readable storage storing such a program.

According to an example aspect of the present disclosure a method for transmitting positioning reference signals, PRS, by a first base station in a wireless communication system, is provided, the method comprising transmitting, a first PRS having a first PRS pattern with a first subcarrier spacing, SCS, receiving information associated with positioning of the user equipment, UE, based on the first PRS and a second PRS, wherein the second PRS is from a second base station having a second PRS pattern with a second SCS which is different from the first SCS.

According to an example aspect of the present disclosure a method for receiving position reference signals, PRS, by a User Equipment, UE, in a wireless communication system, is provided, the method comprising receiving, from a first base station, a first PRS having a first PRS pattern with a first subcarrier spacing, SCS, receiving, from a second base station, a second PRS having a second PRS pattern with a second SCS which is different from the first SCS, and obtaining positioning information associated with positioning of the UE, based on the first PRS and the second PRS, transmitting to the first base station the positioning information.

In an example of the present disclosure wherein the first PRS pattern has a first repetition frequency and the second PRS pattern has a second repetition frequency wherein each of the first repetition frequency and the second repetition frequency is determined by the number of slots in the subframe. Wherein the first PRS pattern is a diagonal pattern with respect to a slot. Wherein transmitting the first PRS includes transmitting the first PRS having at least part of the first PRS pattern in a first symbol of a first slot of a subframe. Wherein the at least part of the first PRS pattern and the second PRS pattern is placed in every symbol of a slot in a subframe.

According to an example aspect of the present disclosure a first base station for transmitting a positioning reference signal (PRS) in a communication system, is provided, the first base station comprising a transceiver; and a controller coupled with the transceiver and configured to control the transceiver to transmit, a first PRS having a first PRS pattern using a first subcarrier spacing, SCS, and to receive information associated with positioning of a user equipment (UE) based on the first PRS from the first base station and a second PRS from a second base station, wherein the first SCS is different form the second SCS applied to the second PRS having a second PRS pattern.

According to an example aspect of the present disclosure a user equipment (UE) for receiving a position reference signal (PRS) in a wireless communication system, the UE comprising a transceiver; and a controller coupled with the transceiver and configured to control the transceiver to receive, from a first base station, a first PRS having a first PRS pattern using a first subcarrier spacing (SCS), to receive, from a second base station, a second PRS having a second PRS pattern using a second SCS which is different from the first SCS, to obtain positioning information associated with positioning of the UE, based on the first PRS and the second PRS, and to transmit, to the first base station, the positioning information.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
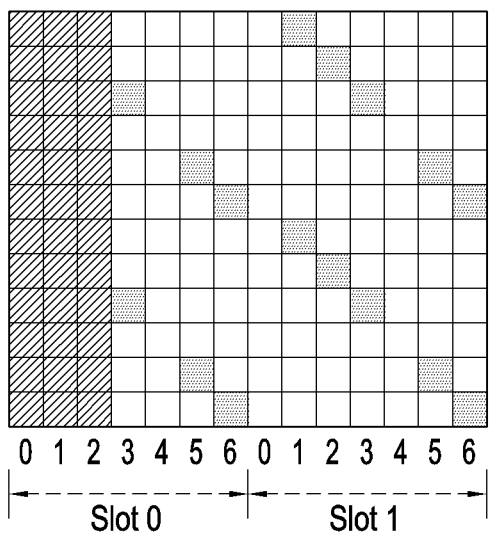
FIG. 1 is a diagram illustrating the use of LTE positioning reference signals (PRS) in subframes with a 15 kHz subcarrier spacing (SCS) and how the same pattern would appear if applied to 30 kHz SCS in 5G NR according to an embodiment.
Figure 1:
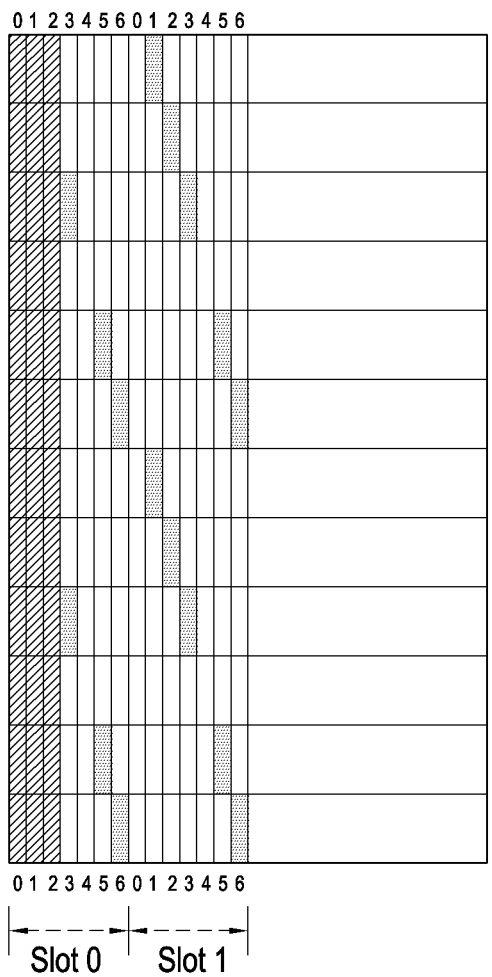

Examples in accordance with the present disclosure will now be described in the context of a 5G wireless communication network, and in particular a NR radio access network forming part of a 5G wireless communication network. It will be understood that the present disclosure is not limited to any particular radio access technology. That is, the use of and configuration of Positioning Reference Signals (PRS) or other signals used for position determination at either the UE (i.e. mobile terminal/terminal device) side or network side are equally applicable in other wireless communication systems where it is desirable to provide positioning techniques that operate across a range of network configurations, and to determine accurate positioning information of a UE and/or base stations such that improvements in system performance and new location dependent functionality can be provided. References to particular 3GPP constructs in certain examples should not be understood as limiting the ability of examples of the present disclosure to be applied to other wireless communication networks.

In 5G NR, and more generally LTE and LTE Advanced systems, approaches to position determination may be separated into three different categories: Radio Access Network (RAN)-dependent techniques, RAN-independent techniques and hybrid techniques, which utilise a combination of the two former techniques in order to complement their operation. RAN-dependent techniques are those that utilise information provided by or derived from signals of the RAN, for example, position information may be determined based on Cell-IDs, E-Cell IDs, Observed Time Difference of Arrival (OTDOA), Uplink Time Difference of Arrival (UTDOA), Angle of Departure (AoD), Angle of Arrival (AoA); and RAN-independent techniques are that utilise information and signals external to the RAN, for example GNSS, Bluetooth, WLAN, Terrestrial Beacon Systems (TBS). From these approaches, there is an effort to improve the capabilities and compatibility of the RAN-dependent techniques so as to provide improved position determination. In particular, improved approaches to the use of techniques based upon signal detection and analysis are sought, in other words techniques such as OTDOA, UTDOA, AoD, and AoA. Consequently, there is a requirement for enhancing the configurability of the reference signals used for the RAN-dependent positioning functionality in 5G NR systems.

In LTE and LTE Advanced, RAN-dependent position determination using techniques such as OTDOA, UTDOA, AoD, and AoA are dependent on the receipt of reference signals, or more precisely, Positioning Reference Signal(s) (PRS) in the downlink and Sounding Reference Signal(S) (SRS) in the uplink. These reference signals take the form of a pseudo random sequence QPSK signal that is generated based on parameters including one or more of physical layer cell identity, slot number, OFDM symbol number, cyclic prefix etc. PRS were introduced in 3GPP LTE Release 9 and therefore further details on PRS can be found in 3GPP TS 36.211 Release 9 version 9.1.0 (30 Mar. 2010). Uplink-based positioning was introduced in 3GPP LTE Release 11, where such positioning is based upon Sounding Reference Signals (SRS), further details on which can be found in 3GPP TS 36.211 Release 11 version 11.7.0 (23 Mar. 2017).

In 5G NR it is envisaged that position functionality may be based on an evolved form of the PRS/SRS or a new form of reference signalling. In the following description, although downlink PRS (DL PRS) are predominantly referred to, the characteristics, configurations and implementation details of the various aspects of 5G NR position determination configurations are not limited to only PRS but are equally applicable to other forms of signals utilised for position determination such as Uplink PRS/SRS or other forms of position reference signalling.

Observed Time Difference of Arrival Positioning

As set out above, numerous different approaches may be used to determine the position of a UE in 5G systems. However, observed time difference of arrival (OTDOA) is likely to be commonly used in conjunction with downlink PRS. OTDOA of arrival operates by measuring the difference in arrival times between reference signals (e.g. downlink PRS) received from multiple transmissions points, which in the case of 5G NR will be gNBs. For example, the arrival time of reference signals from three gNBs will be measured and then a relative arrival time (i.e. observed time difference) will be calculated relative to one of the gNBs, such as the serving gNB for example. The relative arrival times are then transmitted to the serving gNB which can then calculate the position on of the UE based on upon the received measurements and its own location information using a hyperbolic multilateral algorithm. More precisely, taking $t_1$ to be the arrival time of the PRS signal from the $gNB_1$, $t_2$ to be the arrival time of the PRS signal from $gNB_2$ and $t_3$ to be the arrival time of the PRS signal from $gNB_3$ the UE calculates the observed time differences of arrival ($t_{2,1}=t_2-t_1$ and $t_{3,1}=t_3-t_1$) and transmits them to the serving gNB (e.g. $gNB_1$). These calculated values define two hyperbolas, the intersection of which provides the position of the UE. An equivalent procedure may also be performed in the uplink (i.e. UTDOA) based upon uplink reference signals transmitted by the UE to a serving gNB and at least two neighbouring gNBs.

5G NR Positioning

In addition to increasing the accuracy of position determination in 5G NR compared to LTE and LTE Advanced, there are also a number of further aspects that require consideration. For example, positioning techniques should preferably be able to function in both 5G NR frequency ranges of FR1 (450 to 6000 MHz) and FR2 (>6 GHz/24250 to 52600 MHz), and be configurable so that they may operate over the many different network configurations that are envisaged in 5G NR systems. In particular, it is required that positioning techniques are compatible with the adaptable numerology of 5G NR system, which, among other things, includes varying OFDM subcarrier spacing (SCS) and a varying number of slots in a subframe. Furthermore, positioning techniques should operate at the minimum 5G NR bandwidth of 5 MHz but be scalable to higher bandwidths; they should be applicable to Internet of Things (IoT) devices, and also support voice and data devices; they should be efficient and low complexity for the various use cases whilst preferably using a common architecture where possible. Given these desired requirements, positioning techniques with a large degree of configurability and/or compatibility are required for 5G NR.

With respect to OFDM SCS in 5G NR, six different SCS are specified, as set out in Table 1 below

TABLE 1

| $\mu$ | SCS ($\Delta f = 2^\mu \times 15$ kHz) | Cyclic Prefix | Frequency Band |
|---|---|---|---|
| 0 | 15 kHZ | Normal | FR1 |
| 1 | 30 kHZ | Normal | FR1 |
| 2 | 60 kHZ | Normal, Extended | FR1, FR2 |
| 3 | 120 kHZ | Normal | FR2 |
| 4 | 240 kHZ | Normal | FR2 |
| 5 | 480 kHZ | Normal | FR2 |

As set out above, when performing position determination using OTDOA a UE is required to receive PRS from at least three different gNBs. Consequently, it is possible that two of more the gNBs that a UE is required to receive PRS from may be operating cells with different SCS. For example, depending on the devices operating in each of the cells operated by the gNBs, different SCS may be chosen. However, as is explained in more detail below, when operating in accordance with existing LTE PRS patterns, the PRS transmitted by gNBs operating with different SCS may not align in the time domain and there may also be an overlap in the subcarriers allocated with PRS in the each of the cells operated by the gNBs, thus causing problems when a UE is attempting to receive PRS signals from different cells.

With reference to Table 1, SCS can be scaled by factors of $2^\mu$ in relation to the base SCS of 15 kHz (which is the only SCS supported in LTE). A consequence of the increasing SCS is that the symbol duration is shortened by the same factor(s) of $2^\mu$. In 5G NR, one slot is defined as 14 symbols and for higher SCS, the duration of the slots will be shortened. However, a subframe is continued to be defined as a 1 ms period, fitting in one slot in the 15 kHz SCS. However, for the higher SCS, more slots (i.e. a factor of $2^\mu$) will fit into a sub-frame.

An LTE subframe (1 ms duration) will always contain 2 slots and the PRS pattern for LTE is illustrated in FIG. 1(a), where the time/frequency resources are shown on a resource element (RE) level (i.e. one subcarrier by one OFDM symbol) and two LTE slots i.e. a single physical resource block (PRB), are shown. The PRS pattern is broadly diagonal across the 2 slots of the subframe and are not transmitted in the Physical Downlink Control Channel (PDCCH) allocated symbols of 0, 1 and 2 in slot 0. There are also gaps in the diagonal pattern to accommodate the cell specific reference signal (CRS) that are transmitted in LTE. Also, the subframes where the PRS patterns are included do not contain any data (no Physical Downlink Shared Channel (PDSCH) bits) so there will be no interference from PDSCH when receiving the PRS patterns from adjacent eNBs in the DL for the UEs.

In LTE, when a normal cyclic prefix is used, the PRS pattern is generated based on the following equation $$k = 6(m + N_{RB}^{DL} - N_{RB}^{PRS}) + (6 - l + v_{shift}) \bmod 6$$

$$l = \begin{cases} 3, 5, 6 & \text{if } n_s \bmod 2 = 0 \\ 1, 2, 3, 5, 6 & \text{if } n_s \bmod 2 = 1 \text{ and } (1 \text{ or } 2 \text{ PBCH antenna ports}) \\ 2, 3, 5, 6 & \text{if } n_s \bmod 2 = 1 \text{ and } (4 \text{ PBCH antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

The parameter $v_{shift}$ accounts for different eNBs and up to 6 eNBs can be accommodated, generating different diagonal patterns of PRS so the PRS from neighbouring eNBs do not interfere with one another.

It should also be noted that the observed timing difference accuracy will depend on the sampling rate, which in LTE is proportional to the 15 kHz SCS. A common approach for timing detection is to obtain the received signal before the cyclic prefix (CP) removal in the OFDM receiver chain, and then correlate in the time domain with a locally generated PRS signal, sampled at the receiver clock rate. Although the received signal can be corrupted by interference from the other subcarriers in the same symbol and the CP, there will be the Gold sequence of the PRS embedded and the correlation will generate a peak to enable the determination of the timing offset.

Turning to 5G NR, when neighbouring gNBs operate multiple SCS in the same frequency range (FR1 or FR2), the UE may still employ the above (pre fast Fourier transform (FFT stage)) correlation technique to detect the timing difference. However, the UE will have to try with different PRS symbol durations and patterns, to find the actual sequence that will generate a correlation peak. Consequently, since such a repetitive correlation process using digital signal processing (DSP) is complex and thus has a relatively high power consumption, if the UE is a power constrained device (like a sensor device), this technique may not be suitable for preserving its battery life.

In an alternative approach, the CP is firstly removed, an FFT performed, and then the correlation process for the detected PRS signal using a local PRS copy in the frequency domain. When the PRS pattern is detected, the related local copy can be identified and the correct correlation can be generated with a single attempt. Also, since the detected signal is cleared of the CP and other subcarrier (non-PRS, in the same symbol) interference, this method may be more robust and can be used to detect PRS from distant cells, with low signal to interference plus noise ratio (SINR).

A practical scenario where this approach will be useful is when a sensor device is connected to a Marco cell utilizing 15 kHz SCS and also having femto cells in the near vicinity, operating at a higher SCS (e.g. 30 kHz or 60 kHz). The sensor device may utilise the second method of correlation (post FFT, in the frequency domain) to estimate the timing offset. The below proposed PRS design solutions will be useful in such a scenario but are not limited to such a scenario.

FIG. 1 with (b) illustrates the use of the exact LTE PRS pattern in 5G NR when a SCS of 30 kHz is used, such that FIGS. 1(a) and 1(b) illustrates the PRS patterns of neighbouring gNBs with different SCS in corresponding (i.e. aligned/synchronised) subframes when existing LTE PRS patterns are used in 5G NR. The existing PRS pattern is distributed in the same manner with respect to the 12 subcarriers and first 14 symbols, however, due to the increased SCS the 14 symbols are contained with the time period of 1 slot of the 15 kHZ SCS.

As can be seen from FIG. 1 with (a) and (b), alignment of the PRS between the subframes/cells with 15 kHz and 30 kHz SCS does not occur. For example, when the PRS starts on symbol 3 of slot 0 of the 30 kHz SCS cell (FIG. 1(b)), PDCCH symbols are still being transmitted in the 15 kHz SCS cell, thus possibly causing interference in the reception of the PRS from the 30 kHz SCS cell. Furthermore, the gaps left for the CRS REs in LTE may also have a detrimental effect on the alignment of the PRS patterns in the two cells. Lastly, it should be noted that each symbol in FIG. 1 will have a CP at the start (not shown) and having different numerologies can complicate the removal of the CP.

Consequently, there is a need for an approach to the provision of PRS in 5G NR system that alleviates the problems that may occur when neighbouring gNBs operate their cells with different SCS and PRS are transmitted in corresponding (i.e. aligned) subframes. In accordance with an example of the present disclosure, a first for addressing the aforementioned problems is to utilize a PRS pattern suitable for a 5G NR 15 kHz SCS numerology, and then repeating the pattern with a SCS-based repetition frequency such that a pattern is repeated $2^H$ times in the $2^H$ slots within the selected subframe(s) for PRS, for higher 5G NR numerologies of $2^H \times 15$ kHz SCS.

By virtue of this approach, UEs aware of the different SCS will be able to track the PRS and read/receive sufficient PRS required for the purposes of receiving a full PRS pattern and thus positioning within an applicable subframe. Although UEs in each of the lower SCS and higher SCS cells will be running different sampling clocks/frequencies corresponding to their serving cell's SCS, the UEs in both cells will be able to read the PRS patterns of the neighbouring cells.

Figure 2:
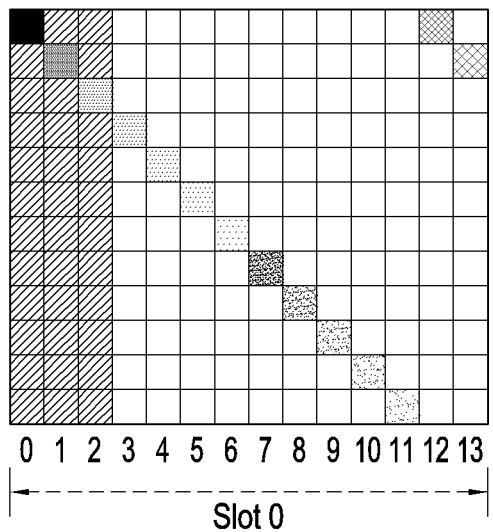
FIG. 2 is a diagram illustrating the use of a proposed configuration of PRS in subframes in 5G NR with 15 kHz and 30 kHz SCS according to an embodiment.
Figure 2:
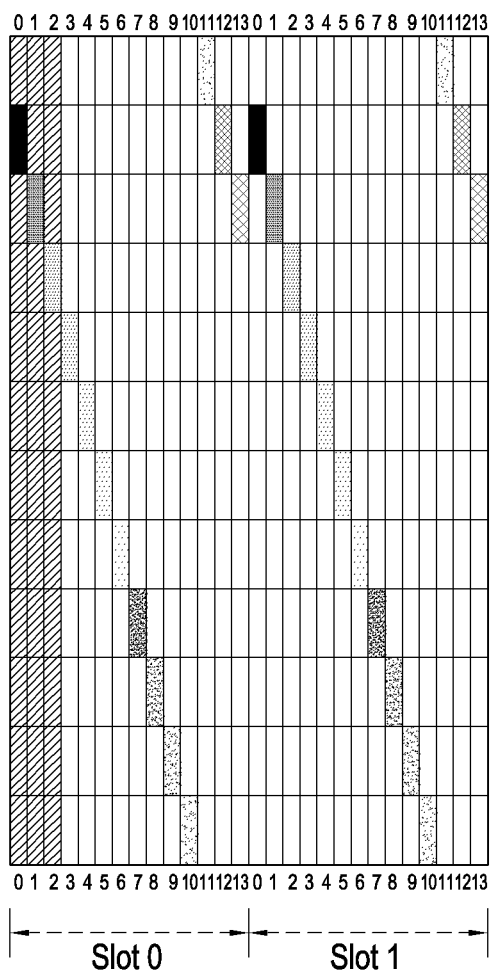

FIGS. 2(a) and 2(b) illustrate example PRS patterns for 15 kHZ SCS and a 30 kHz SCS, respectively in accordance with this example of the present disclosure. As can be seen, 5G NR numerologies will enforce 1 slot per sub-frame in the 15 kHz SCS cell and 2 slots per subframe in the 30 kHz SCS cell.

As can be seen, as part of the this first approach one or more of the following may be included: the PDCCH is punctured in order to accommodate PRS such that the PRS pattern can start from slot 0, symbol 0; symbol gaps previously used for the transmission of CRS in LTE have been removed and PRS transmitted in their place; the same PRS pattern is repeated in in all slots of the subframe; and lastly a block diagonal arrangement is used to avoid collisions of PRS transmitted by neighbouring gNBs. Furthermore, as can be seen from FIGS. 2(a) and 2(b), due to the puncturing of the PDCCH and the removal of CRS, a part of the PRS pattern for each SCS is transmitted in every symbol within each slot.

As a result of the proposed approach to the PRS patterns, the PRS pattern fills all 14 symbols per slot (at a given subcarrier position), and will be repeated (with a given offset per cell) in the 2 slots of the 30 kHz SCS. Furthermore, the problems associated with using existing LTE PRS patterns in neighbouring cells operating with different SCS are reduced. For example, considering a frequency reference point as the subcarrier at the top of each of FIGS. 2(a) and 1(b), the PRS patterns will be orthogonal and will not collide, even when the same PRS pattern is repeated for the 15 kHz SCS cell on a second PRB in subcarriers below the 12 subcarriers not depicted in the FIG. 2 with (a).

Although FIGS. 2(a) and 2(b) relate to a scenario with 2 gNBs operating with different SCS, the approach described with reference to these figures may be applied to 3 or more gNBs by varying the frequency (i.e. subcarrier) shift in PRS pattern between the gNBs in a similar manner to that set out for LTE PRS described above.

In addition to the alleviation of the aforementioned problems, the proposed approach enables a UE to efficiently receive PRS from neighbouring cells that have been transmitted using different SCS. For example, with reference to FIG. 2 with (a) and (b), a UE that is connected to the 15 kHz numerology gNB and has the gNB of 30 kHz numerology as a neighbour will be running the sampling clock/frequency (f) based on 15 kHz SCS, and therefore may easily receive the PRS transmitted by the 15 kHz gNB using either of methods described above for example.

With respect to receiving the PRS transmitted by the gNB operating with a SCS of 30 kHz, the UE can first receive the even symbols in the first slot of the neighbouring gNB PRS (in the subframe depictions of FIG. 2(b)) with readings from the first half of sampling instances per symbol (as defined for 15 kHz SCS), and then the odd symbols of the second slot and finally combine them accordingly to generate the PRS sequence. To read the odd symbols of the 30 kHz SCS PRS, the UE will switch to taking readings from the second half of sampling instances from symbol 7 (of its serving cells time grid) onwards. Consequently, for the 30 kHz SCS cell, this time period corresponds to its slot 1 and as the same PRS pattern is repeated here, the UE will capture the missing odd numbered symbols. This approach may be applied to one or more neighbouring cells/gNBs operating at a higher SCS than the UE and that the UE requires a PRS from in order to perform position determination, where the selection of the specific cells and the order of reception of their respect PRS may be determined based on UE-specific parameters.

Given that it is proposed to repeat the PRS patterns several times in successive subframes, the UE can execute reading the PRS patterns of the serving cell and the neighbouring cell in adjacent subframes. Furthermore, when larger differences in SCS exist between neighbouring cells, a UE operating at a sampling frequency corresponding to the lower SCS, may receive a different part of the PRS of its neighbouring cell in each of the repeated transmissions of the PRS (i.e. in each slot) of the neighbouring cell and form the PRS pattern from these different parts.

Figure 3:
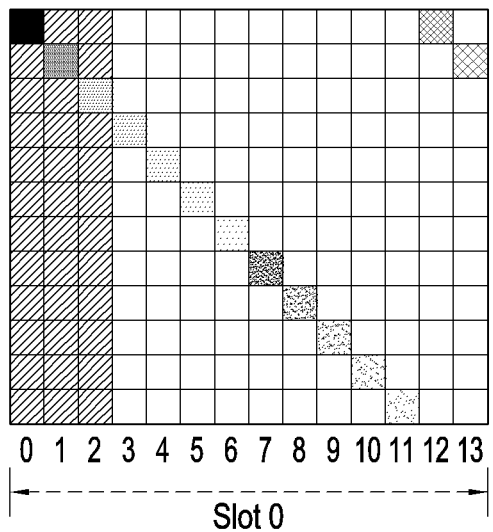
FIG. 3 is a diagram illustrating the use of a proposed configuration of PRS in subframes in 5G NR with 15 kHz and 30 kHz SCS according to an embodiment.
Figure 3:
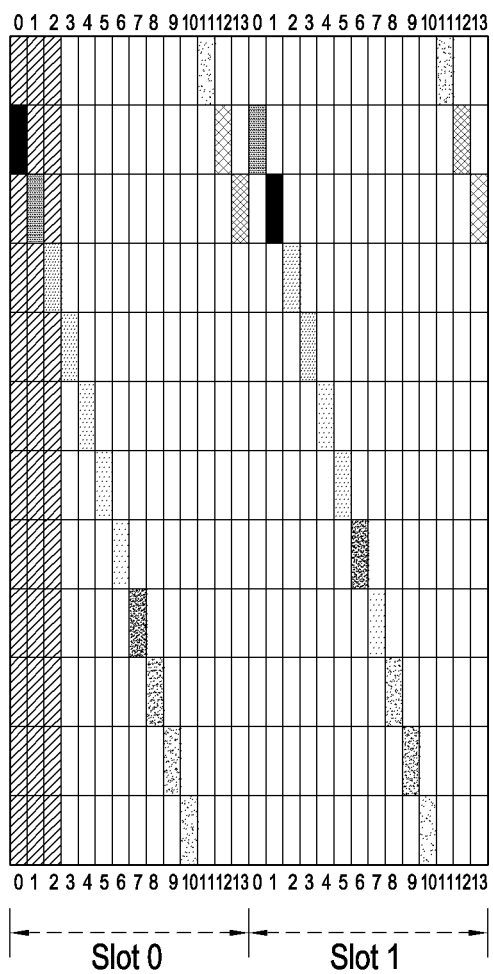

As an alternative to this reception technique, the PRS pattern for the second slot (slot (1)) of the 30 kHz SCS cell may have the even and odd PRS symbols swapped, as shown in FIG. 3 with (b) by the shading of each PRS RE. This will enable the UE operating at the lower SCS (15 kHz) UE to read the 30 kHz SCS cell PRS symbols from sampling only the first half of its symbol durations and to read the PRS pattern. This may be advantageous since the CPs have to be removed and the CP of the first symbol is usually slightly longer than the remaining symbols in a slot, thus simplifying the CP detection and removal processes.

In examples where the SCS spacing is higher than 30 kHz, some advantages in terms of UE reception may be obtained by, where possible, cyclically shifting symbols of sized groups of PRS symbols such that a different symbol of each of the groups coincides with the beginning of the symbols of a cell operating with the lower SCS e.g. 15 kHz. In some examples, the length of the PRS may vary e.g. (12 or 16 symbols), and therefore the specific rearrangement of the PRS symbols may also be dependent upon the length of the PRS, for example.

In the reverse scenario in which the UE connected to the 30 kHz gNB and is required to receive PRS transmitted by a neighbouring gNB operating with a 15 kHz SCS, the UE will be operating at a higher sampling speed due to the shorter symbol durations. In this case, when receiving the PRS of the 15 kHz gNB, the UE will may read 2 instances of the same PRS value (in 2 symbol timings for the UE). Consequently, the UE can discard the second reading for each of the 2 symbol blocks. Although the UE will be operating at a higher sampling frequency, it will only be able to obtain the full PRS pattern at the end of the subframe period, while for its own PRS, the full pattern will be detected at half of this time i.e. the PRS of a gNB can be read in a minimum time of 1 slot of the gNB transmitting the PRS regardless of the SCS which the receiving UE is operating at.

It should be noted that the illustrated PRS patterns are merely examples, and that other designs providing the same advantages are possible, for example, those having diagonal patterns in the opposite direction or where a different rearrangement of the odd and even symbols is used in order to simply the reception process.

In particular, to achieve the interoperability of PRS between gNBs operating with different SCS, the slots should be filled with the PRS pattern from symbol 0 to symbol 13 without symbol gaps, and the same pattern should be repeated in every slot in the subframe. For example, whilst the described examples cover only a 2 times ($2^\mu$, $\mu=1$) increase in the SCS (i.e. 15 kHz and 30 kHz), the proposed approach may be extended to any of the defined SCS in 5G NR (for both FR1 and FR2), where the repetition rate for the PRS pattern will be given by the number of slots ($2^\mu$) per subframe.

In this more general case, UEs may receive the full PRS of neighbouring cells operating with different SCS using an approach similar to that described above with reference to FIGS. 2(a) and 2(b). For example, if a UE is operating with a SCS of 15 kHz and a neighbouring cell is operating with a SCS of 60 kHz and the PRS pattern is similar to that of FIGS. 2(a) and 2(b), the UE may receive the PRS of the 60 kHz cell by reading one in every 4 ($2^\mu$, $\mu=2$) symbols based upon a starting symbol offset by the slot number in each slot, and then combining the read symbols to form the full PRS pattern at the end of the subframe.

Figure 4:
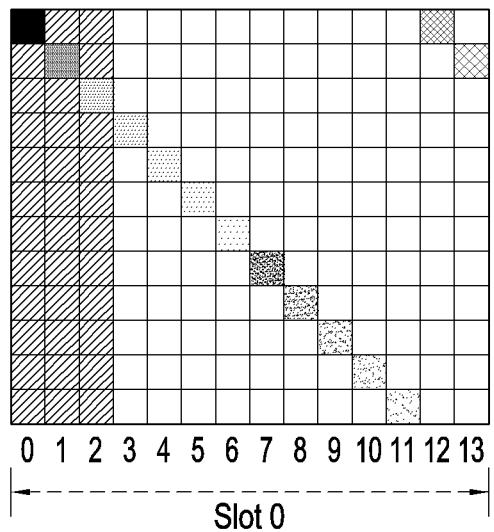
FIG. 4 is a diagram illustrating the use of a proposed configuration of PRS in subframes in 5G NR with 15 kHz and 30 kHz SCS according to an embodiment.
Figure 4:
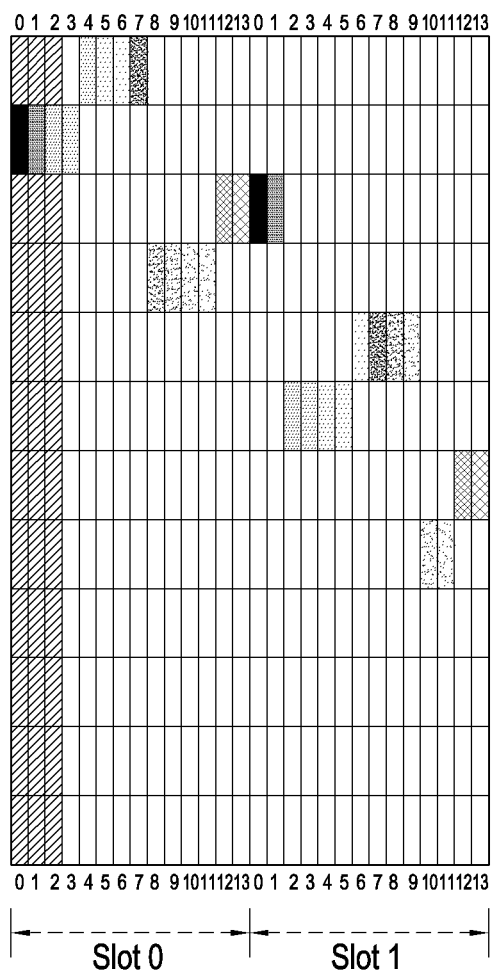

In accordance with another example of the present disclosure, in second approach to enabling the provision of aligned and/or non-colliding PRS between gNBs operating with different SCS, the PRS pattern may have a block diagonal pattern in the higher SCS gNB. This approach is illustrated in FIG. 4 with (a) and (b).

As can been see from FIGS. 4(a) and 4(b), such a pattern ensures that there will be no collisions in the subcarrier positions in the frequency domain, even when the lower SCS PRS pattern is repeated in another PRB below the currently depicted PRB.

For example, in the PRS pattern of FIG. 4(b), the first 4 symbols of the 15 kHz SCS diagonal pattern is provided as a horizontal pattern in the 30 kHz SCS cell and avoids the first 30 kHz subcarrier (i.e. 2 subcarriers of the 15 kHz SCS) so as not to collide with the PRS of the 15 kHz cell transmitted in the first two symbols. More generally, the block diagonal pattern avoids the subcarriers of the lower SCS cell occupied by the PRS at specific symbols (i.e. where collisions are possible) by providing a horizontal pattern in the higher SCS on a subcarrier below or above the occupied frequency of the lower SCS pattern.

As for the patterns illustrated in FIGS. 2(a) and 2(b) the UE operating in the cell with the lower SCS may and thus with a lower sampling frequency may receive the complete PRS of the higher SCS cell by receiving even symbols in slot 0 and odd symbols in slot 0, by utilising the other approaches set out with respect to FIGS. 2(a) and 2(b).

In accordance with another example of the present disclosure, a third approach to enabling the provision on non-colliding PRS between gNBs operating with different SCS may be to maintain the existing LTE PRS patterns but when two patterns are colliding due to different PRS density/pattern and/or numerology and/or frame structure settings, one of the pattern can be punctured or shifted in time/frequency domain by K symbols/subcarriers to avoid the collision. This may be achieved via cooperation between neighbouring gNBs.

In accordance with another example of the present disclosure, the first and second approaches may be implemented jointly, or separately as the needs dictate. For example, if PRS muting (i.e. periodically not transmitting a PRS symbol/pattern where one would normally be transmitted), which is also a feature in LTE, is enacted, the higher SCS neighbour cell PRS can be muted when the lower SCS service cell PRS is active (and vice versa) and this will eliminate any collisions in the frequency domain.

For all the preceding approaches, although the PRS pattern have been illustrated as having a diagonal pattern in another direction in the PRB, for example they may also have an anti-diagonal pattern.

Furthermore, although the foregoing approaches have been set out for downlink PRS, they may also be applied to uplink PRS in order to reduce the likelihood of colliding uplink PRS transmitted by UEs in both a single cell and neighbouring cells. In some examples in which uplink PRS are being transmitted, a gNB may be required to perform the detection of different UE's PRS, where the UEs are operating with different SCS.

UE and gNB Operation

Figure 5:
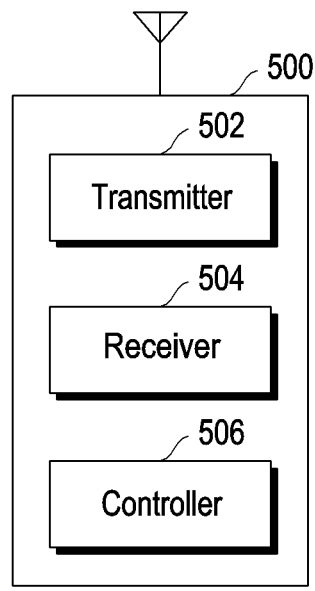
FIG. 5 is a diagram illustrating an example structure of a 5G NR gNB according to an embodiment.
Figure 6:
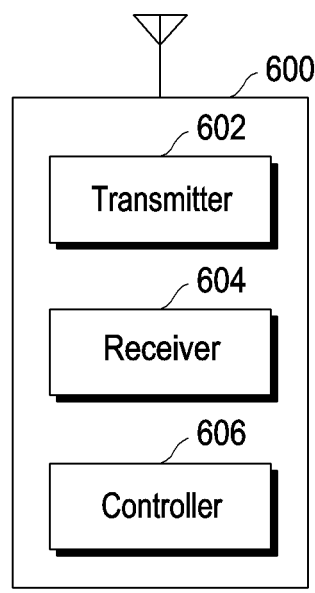
FIG. 6 is a diagram illustrating an example structure of a 5G NR UE according to an embodiment.

FIGS. 5 and 6 described below illustrate the general operation of a UE and a gNB implementing positioning functionality based on the any of the above-described configurations.

FIG. 5 provides a schematic diagram of the structure of a gNB 500 which is arranged to operate in accordance with the examples described above. The gNB 500 includes a transmitter 502 arranged to transmit signals to a UE; a receiver 504 arranged to receive signals from a UE; and a controller 506 arranged to control the transmitter and receiver and to perform processing such as in accordance with the above described methods, and also to communicate with the core network.

FIG. 6 provides a schematic diagram of the structure of a UE 600 which is arranged to operate in accordance with the examples of the present disclosure described above. The UE 600 includes a transmitter 602 arranged to transmit signals to one or more gNBs; a receiver 604 arranged to receive signals from one or more gNBs; and a controller 606 arranged to control the transmitter and receiver and to perform processing in accordance with the above described methods.

Although in FIGS. 5 and 6 the transmitter, receiver, and controller have been illustrated as separate elements, any single element or plurality of elements which provide equivalent functionality may be used to implement the examples of the present disclosure described above.

Figure 7:
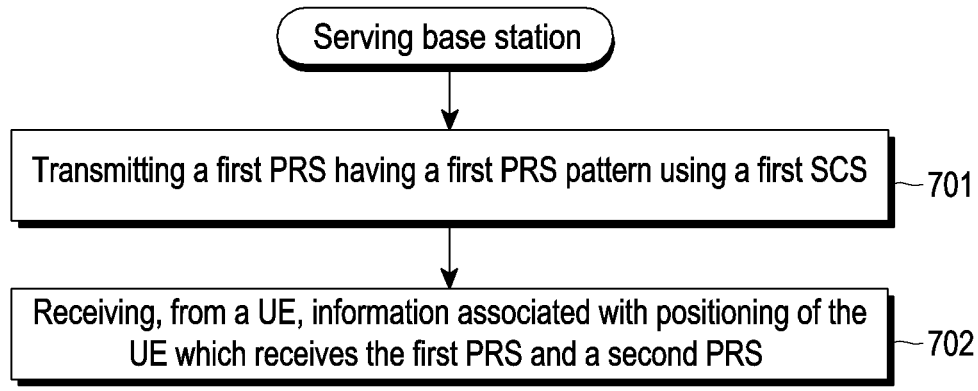
FIG. 7 is a flowchart illustrating an example method of approaching in aspect of a serving base station which is transmitting a PRS signals according to an embodiment.

FIG. 7 illustrates the method of transmitting and receiving a PRS by a serving base station. The serving base station can be referred to a first base station. And a neighbour base station of the serving base station may be referred to a second base station which is operating with different SCS from the first base station. The first base station transmits a first PRS having a first PRS pattern using a first SCS in step 701. The UE communicates with the serving base station and may receive the second PRS transmitted by the neighbouring base station. The first base station receives, from the UE, information associated with positioning of the UE which receives the first PRS and the second PRS in step 702. The information associated with positioning of the UE may include difference in arrival times between the first PRS and the second PRS or information on the arrival times.

Figure 8:
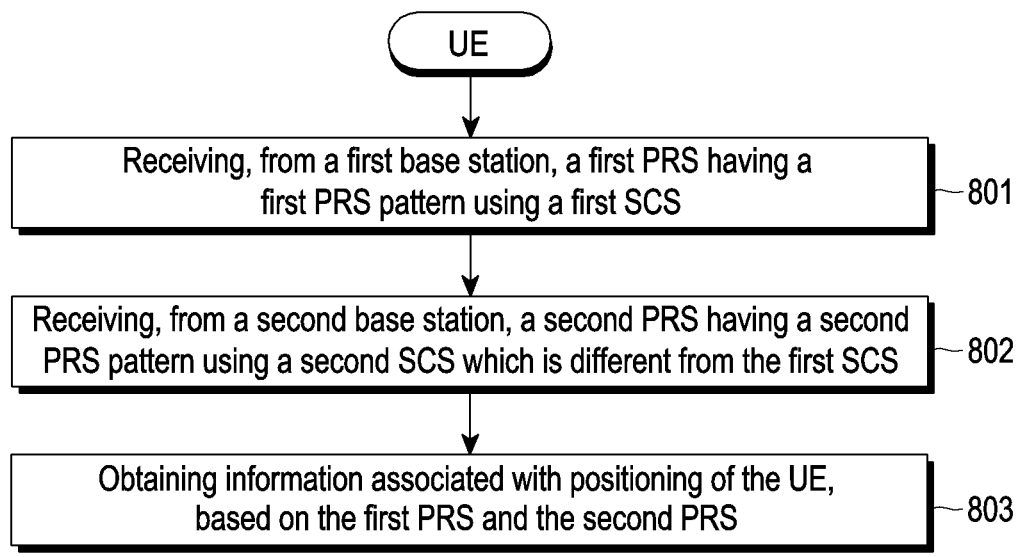
FIG. 8 is a flowchart illustrating an example method of approaching in aspect of a UE which is receiving PRS signals from one or more base stations according to an embodiment.

FIG. 8 illustrates the method of receiving a PRS by a UE. A serving base station can be referred to a first base station. And a neighbour base station may be referred to a second base station which is operating with different SCS from the first base station. The UE communicates with the serving base station and may receive a PRS transmitted by the neighbouring base station. Referring to FIG. 8, the UE receives, from the first base station, a first PRS having a first PRS pattern using a first SCS in step 801. The UE receives from the second base station, a second PRS having a second PRS pattern using a second SCS which is different from the first SCS in step 802. The UE obtains information associated with positioning of the UE, based on the first PRS and the second PRS in step 803. The first base station may receive, from the UE, information associated with positioning of the UE which receives the first PRS and the second PRS.

Throughout the description and claims of this specification, the words "comprise" and "contain" and variations of them may refer, for example, to "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the present disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. Examples of the present disclosure extend to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The various embodiments of the present disclosure may also be implemented via computer executable instructions stored on a computer readable storage medium, such that when executed cause a computer to operate in accordance with any other the aforementioned embodiments.

The above embodiments are to be understood as illustrative examples of the present disclosure. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be used without departing from the scope of the disclosure, including as defined in the accompanying claims.

What is claimed is:

1. A method for transmitting a positioning reference signal (PRS) by a first base station in a wireless communication system, the method comprising:
    transmitting a first PRS having a first PRS pattern using a first subcarrier spacing (SCS),
    receiving, from a user equipment (UE), information associated with positioning of the UE which receives the first PRS from the first base station and a second PRS from a second base station, the second PRS being transmitted, by the second base station, to the UE using a second SCS,
    wherein the first SCS is different from the second SCS applied to the second PRS having a second PRS pattern, and
    wherein at least one of the first and the second PRS pattern is configured by a SCS and a cyclic prefix (CP).

2. The method of claim 1, wherein the first PRS pattern has a first repetition frequency and the second PRS pattern has a second repetition frequency, and wherein each of the first repetition frequency and the second repetition frequency is determined by a number of slots in a subframe.

3. The method of claim 1, wherein the first PRS pattern is a diagonal pattern with respect to a slot.

4. The method of claim 1, wherein at least part of the first PRS pattern and the second PRS pattern is placed in every symbol of a slot in a subframe.

5. A method for receiving a positioning reference signal (PRS) by a user equipment (UE) in a wireless communication system, the method comprising:
    receiving, from a first base station, a first PRS having a first PRS pattern using a first subcarrier spacing (SCS),
    receiving, from a second base station, a second PRS having a second PRS pattern using a second SCS which is different from the first SCS,
    obtaining positioning information associated with positioning of the UE based on the first PRS and the second PRS, and
    transmitting, to the first base station, the positioning information,
    wherein at least one of the first and second PRS pattern is configured by a SCS and a cyclic prefix (CP).

6. The method of claim 5, wherein the receiving the first PRS includes sampling the first PRS at a sampling frequency corresponding to one of the first SCS or the second SCS, and wherein the receiving the second PRS includes sampling the second PRS at the sampling frequency.

7. The method of claim 6, wherein, when the sampling frequency corresponds to the first SCS, receiving the second PRS comprises receiving a first portion of the second PRS in a first slot and a second portion of the second PRS in a second slot.

8. The method of claim 7, wherein at least part of the first PRS pattern and the second PRS pattern is placed in every symbol of a slot in a subframe.

9. The method of claim 5, wherein the first base station and the second base station respectively operate in a first cell with the first SCS and in a second cell with the second SCS.

10. The method of claim 9, wherein each subframe of the first cell is divided into one or more slots based on the first SCS, and each slot of the first cell is divided into a plurality of symbols, and
    wherein each subframe of the second cell is divided into one or more slots based on the second SCS, and each slot of the second cell is divided into a plurality of symbols.

11. A first base station for transmitting a positioning reference signal (PRS) in a communication system, the first base station comprising:
    a transceiver; and
    a controller configured to control the transceiver to:
        transmit a first PRS having a first PRS pattern using a first subcarrier spacing (SCS), and
        receive information associated with positioning of a user equipment (UE) based on the first PRS from the first base station and a second PRS from the second base station, the second PRS being transmitted by the second base station to the UE using a second SCS,
    wherein the first SCS is different from a second SCS applied to the second PRS having a second PRS pattern, and
    wherein at least one of the first and the second PRS pattern is configured by a SCS and a cyclic prefix (CP).

12. The first base station of claim 11, wherein the first PRS pattern has a first repetition frequency and the second PRS pattern has a second repetition frequency, and wherein each of the first repetition frequency and the second repetition frequency is determined by a number of slots in a subframe.

13. The first base station of claim 12, wherein at least part of the first PRS pattern and the second PRS pattern is placed in every symbol of a slot in a subframe.

14. The first base station of claim 11, wherein the first PRS pattern is a diagonal pattern with respect to a slot.

15. A user equipment (UE) for receiving a position reference signal (PRS) in a wireless communication system, the UE comprising:
    a transceiver; and
    a controller configured to control the transceiver to:
        receive, from a first base station, a first PRS having a first PRS pattern using a first subcarrier spacing (SCS) through the transceiver, receive, from a second base station, a second PRS having a second PRS pattern using a second SCS which is different from the first SCS through the transceiver, obtain positioning information associated with positioning of the UE based on the first PRS and the second PRS, and transmit, to the first base station, the positioning information through the transceiver, wherein at least one of the first and second PRS pattern is configured by a SCS and a cyclic prefix (CP).

16. The UE of claim 15, wherein the controller is configured to sample the first PRS and the second PRS at a sampling frequency corresponding to one of the first SCS or the second SCS.

17. The UE of claim 16, wherein, when the sampling frequency corresponds to the first SCS, the controller is configured to control the transceiver to receive a first portion of the second PRS in a first slot and a second portion of the second PRS in a second slot.

18. The UE of claim 17, wherein the first base station and the second base station respectively operate in a first cell with the first SCS and in a second cell with the second SCS.

19. The UE of claim 17, wherein at least part of the first PRS and the second pattern is placed in every symbol of a slot in a subframe.

20. The UE of claim 18, wherein each subframe of the first cell is divided into one or more slots based on the first SCS, and each slot of the first cell is divided into a plurality of symbols, and wherein each subframe of the second cell is divided into one or more slots based on the second SCS, and each slot of the second cell is divided into a plurality of symbols.

* * * * *